INVENTOR
ROBERT E. NEWCOMER
BY Gravely, Lieder & Woodruff
ATTORNEYS

United States Patent Office 3,551,994
Patented Jan. 5, 1971

3,551,994
METHOD FOR PRODUCING STRUCTURAL MEMBERS
Robert E. Newcomer, St. Louis, Mo., assignor to McDonnell Douglas Corporation, St. Louis County, Mo., a corporation of Maryland
Filed Nov. 12, 1968, Ser. No. 774,982
Int. Cl. B23k 31/02
U.S. Cl. 29—471.1                                           7 Claims

ABSTRACT OF THE DISCLOSURE

A structural member of complex cross-sectional shape is formed by encapsulating bars of simple cross-sectional shape in a matrix with the bars abutting one another therein. The pack so formed is heated and then rolled such that it is transversely reduced in two dimensions. This causes the bars to bond to one another in the complex shape. The matrix is then removed.

---

This invention relates in general to the production of structural members and more particularly to a method of producing structural members formed close to the desired final configurations and having complex cross-sectional shapes.

While aluminum can be easily extruded into elongated structural members having close tolerance complex shapes in cross-section, some structural metals are not as easy to extrude to thin sections. Titanium, which is replacing aluminum in many applications in the aircraft industry, is one of those metals. Heretofore, titanium has been formed into structural members of complex shape by machining operations or by welding simple shapes such as flat bars together into more complex shapes. Machining operations on titanium, however, are far more difficult to perform than machining operations on more common metals such as aluminum, and, furthermore, they are time consuming. Also, machining necessarily involves the removal of considerable quantities of the metal, particularly in the case of complex shapes, and due to the relatively high cost of titanium, machining becomes prohibitive from an economic standpoint where even minor amounts of the metal are removed. Welding titanium on the other hand is difficult, requiring care and a high degree of skill, and furthermore, requires additional processing such as stress relieving, all of which add appreciably to the cost of manufacture.

One of the principal objects of the present invention is to convert two or more structural members of relatively simple cross-sectional shape into a structural member of more complex cross-sectional shape through roll bonding. Another object is to provide a method for economically producing titanium structural members of complex cross-sectional shape. A further object of the present invention is to produce an elongated structural member of close tolerance cross-section from shorter members. An additional object is to produce structural members of complex cross-sectional shape by using conventional rolling mill equipment. Still another object is to produce structural members of the type stated by a method which is economically competitive with existing methods for forming such shapes. These and other objects and advantages will become apparent hereinafter.

The present invention is embodied in a process for producing structural members of complex cross-sectional shape by encapsulating abutting metal bars in a matrix formed from a different metal, hot rolling the pack so formed such that it transversely reduced in two dimensions, and then removing the matrix, leaving the reduced bars bonded together at their abutting surfaces. The invention also consists in the process and in the steps hereinafter described and claimed. In the accompanying drawings which form part of the specification and wherein like numerals and letters refer to like parts wherever they occur:

Figure 1:
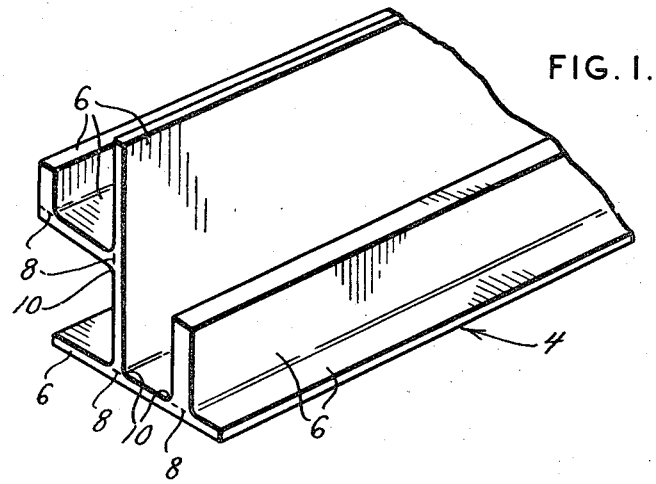
FIG. 1 is a perspective view of a structural member formed by the process of the present invention.

Referring now in detail to the drawings, 4 designates a structural member of complex cross-sectional shape consisting of a plurality of bar-like segments 6 which are pressure bonded to one another at joints 8 so that the member 4 is, in effect, an integral unit. The transformation from one intersecting segment 6 to another occurs through fillets 10 to avoid stress concentrations at the joint 8. The metal from which the member 4 is formed should be capable of forming strong bonds when two individual segments of it are heated and then forced together under elevated pressures. As a practical matter, the metal should further be difficult or uneconomical to machine or extrude or to otherwise work in more conventional metal forming operations. Titanium, zirconium, and refractory metals such as molybdenum, columbium, and tantalum as well as alloys of the foregoing are examples of such metals. So are certain high temperature nickel alloys. Titanium, however, is the most significant.

Figure 3:
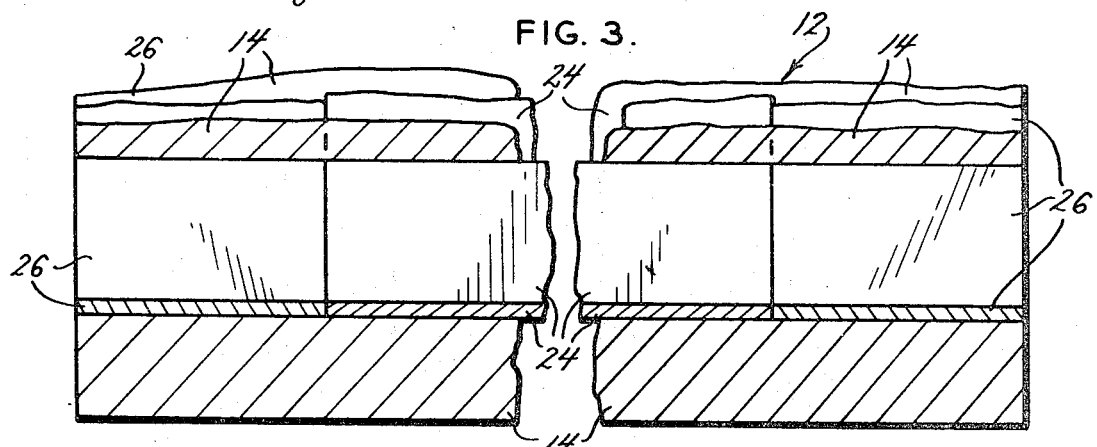
FIG. 3 is a fragmentary sectional view taken generally along line 3—3 of FIG. 2.
Figure 2:
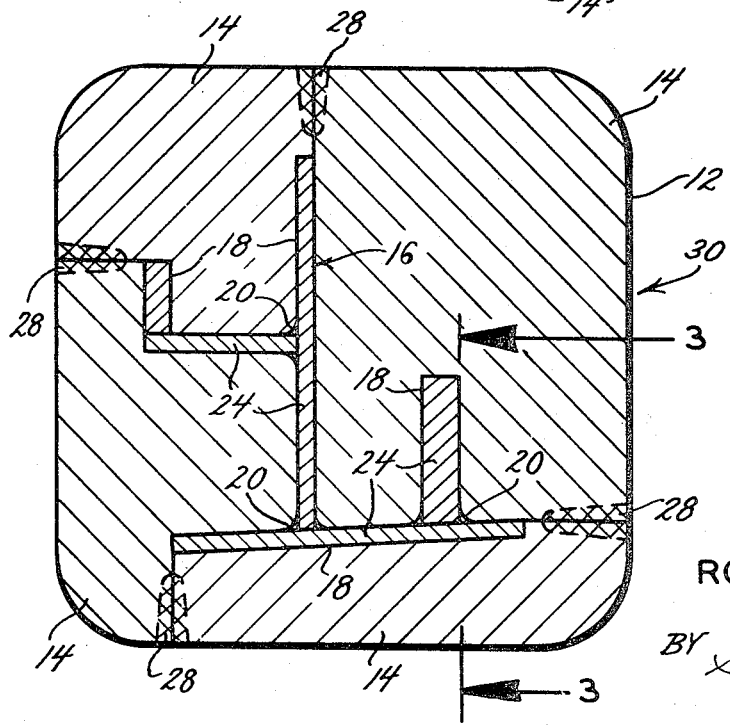
FIG. 2 is a transverse sectional view of a pack used in forming the structural member of FIG. 1.

The structural member 4 is formed by constructing a matrix 12 FIGS. 2 and 3) from a plurality of individual longitudinally extending matrix segments 14 which fit together such that their outer surfaces define a polygonal cross-sectional shape sized for reception by the initial pass of a conventional rolling mill. The inner surfaces of the segments 14 on the other hand, form a void 16 within the matrix 12 and fhat void 16 possesses the same general configuration as the member 4, but is considerably larger. The void 16 is, in effect, formed by a plurality of individual cavities 18 which open into one another when the matrix segments 14 are assembled, but open laterally outwardly when the segments 14 are separated.

The matrix 12 is formed from a metal which is easily machined so that the individual cavities 18 can be formed with relative ease. The metal should, furthermore, not be capable of forming strong bonds with the metal from which the member 4 is formed when the two are heated and forced together at elevated pressures. When the structural member 4 consists primarily of titanium, hot rolled carbon steel plate will serve as an excellent matrix material. The steel plate is preferably transformed into the matrix segments 14 by suitable machining operations, but may be shaped by rolling, drawing or other suitable means.

With the segments 14 of matrix 12 separated, individual bars 24 of titanium or some other suitable pressure bondable metal are inserted into the cavities 18. As previously noted, the cavities 18 of the individual matrix segments 14 when separated open outwardly so that the bars 24 can be inserted into them laterally, that is, without any longitudinal shifting movement between the segments 14 and the bars 24. Moreover, the bars 24 are sized such that when the individual matrix segments 14 are fitted together, the bars 24 will tightly abut one another and completely fill the void 16, except at the arcuate edges 20, at which points the individual bars 24 are, nevertheless, in tight abutment (FIG. 2). The matrix segments 14 are longer than the bars 24 and the portions of each of the cavities 18 located beyond the ends of the bars 24 are fitted with short end bars 26 (FIG. 3) which endwise abut their corresponding bars 24 and thereby plug that portion of the void 16 located beyond the ends of the bars 24.

The bars 26 constitute part of the matrix 12 and are formed from the same material from which the matrix segments 14 are formed. After the bars 24 and 26 are inserted into the cavities 18, the matrix segments 14 are fitted together and welded to one another along their abutting sides where welds 28 are formed. The segments 14 are further welded at their ends to the end bars 26, all in the formation of a rigid pack 30 consisting of the bars 24 completely encapsulated in the matrix 12.

If the bars 24 are formed from titanium or any other metal which is reactive at high temperatures, care must be exercised during assembly of the matrix segments 14, bars 24 and end bars 26 into the pack 30 to insure that the surfaces of the cavities 18 and bars 24 and 26 are free from contaminants. As far as the bars 24 are concerned, it is desirable to subject them to a vapor degreasing operation, an alkaline cleaning process, and finally a pickling process prior to pack assembly. The matrix segments 14 as well as the end bars 26, on the other hand, should be grit blasted to blend out any undesirable tool marks, vapor degreased and alkaline cleaned before the bars 24 are fitted into the cavities 18. During assembly into the pack 30, the matrix segments 14, the bars 24, and the end bars 26 should be handled using white cotton gloves, or in any other manner to avoid contamination.

Once the pack 30 is sealed, it is heated sufficiently to permit rolling in conventional rolling mill equipment. If the bars 24 are primarily titanium, the entire pack 30 should be heated to a temperature slightly below the nominal beta transus for the particular titanium metal or alloy employed and that is the temperature at which the metal changes from a fine crystalline microstructure to a coarse crystalline microstructure. It is more particularly defined as the temperature above which the alpha phase in the titanium metal transforms into beta and the equilibrium condition is entirely beta phase. An alloy consisting essentially of titanium should be heated to within 150° F. of its beta transus and best results are obtained when such an alloy is heated to within 50°–70° F. of its nominal beta transus. Two of the most common titanium alloys are Ti–6Al–4V and Ti–6Al–6V–2Sn, the former having its beta transus at 1820±25° F., while the latter has its beta transus at approximately 1735° F.

After the pack 30 attains the proper elevated temperature, it is reduced in both transverse dimensions in a hot rolling operation to bond the detail parts together and to multiply the laid-up length to the final desired length. Normally the pack 30 will be of such a size that it can be rolled in a conventional rolling mill.

The rolling reduces the cross-sectional area of the pack 30 and causes a corresponding elongation. Of course, the bars 24 within the pack 30 are both transversely reduced in two dimensions and elongated an amount proportional to the corresponding reduction and elongation of the pack 28 itself. The hot rolling further bonds the initially separate bars 24 together into a unitary structure, which is the structural member 4. While a portion of the metal from the bars 24 flows against the acruate edges 20, thereby forming the fillets 10, this flow imparts very little distortion to the final shape of the structural member 4, and what little distortion that does occur exists in the vicinity of the joints 8.

After the pack 30 is reduced by hot rolling to the desired transverse dimensions, the matrix is removed either mechanically or through leaching. Mechanical removal is only practical in the less complex shapes such as tees and, at that, is only possible because the bonds formed between the matrix material and the material from which the bars 24 are formed are quite weak. Leaching is suitable for the more complex shapes such as the shape illustrated in FIG. 1, and when the matrix 12 is formed from steel and the bars 24 from titanium, nitric acid serves as an excellent substance for this purpose, inasmuch as nitric acid readily attacks the steel but not the titanium.

Structural members 4 formed from titanium and constructed in accordance with the method of the present invention have excellent mechanical properties, their yield and tensile strengths approaching that of comparable shapes formed solely by machining. The joints 8 are extremely strong and during some tests, the material failed beyond the joints 8. By reason of the fact that the temperature of the bars 24 is never elevated above their beta transus for the particular titanium metal from which they were constructed, the fine crystalline microstructure is retained and the outer surface of the structural member 4 remains smooth. Accordingly, structural members 4 formed from titanium and its alloys require no further machining to refine their exterior surfaces. Finally, the cross-sectional geometry of the member 4 remains stable through the two dimensional reduction and little distortion occurs.

The following examples illustrate the invention:

EXAMPLE 1

A pack 30 was formed using hot rolled carbon steel plate for the matrix 12 and Ti–6Al–4V titanium alloy for the bars 24. Aside from titanium, Ti–6Al–4V contains 5.5–6.5 percent by weight aluminum, 3.5–4.5 percent by weight vanadium, a maximum of 0.25 percent by weight iron, and traces of other elements. The steel plate was machined to the configuration of the various matrix segments 14 illustrated in FIG. 2. The bars 24 were inserted into the cavities 18 of the matrix segments 14 and the segments 14 were welded together into the pack 30. Before rolling, the outer dimensions of the pack 30 were 5.50" x 5.50 x 95.00", while the bars 24 within the matrix 12 were 82.75 inches long. The packs 30 were soaked at 1750° F. for approximately 30 minutes and then hot rolled in a billet mill having diamond-square passes until the cross-sectional size was 2.5 inches and the length was between 36 and 37 feet. The matrix 12 was removed in a nitric acid bath.

EXAMPLE 2

A pack 30 was fabricated using Ti–6Al–6V–2Sn titanium alloy for the bars 24 and hot rolled carbon steel plate for the matrix 12. Aside from titanium, Ti–6Al–6V–2Sn contains 5.0–6.0 percent aluminum by weight, 5.0–6.0 percent vanadium, 1.5–2.5 percent tin, 0.35–1.00 percent iron, and traces of other elements. The bars 24 were retained by the matrix in the configuration illustrated in FIG. 2. The initial dimensions of the pack were 8.62" x 8.62" x 8'. The length of the bars 24 within the matrix 12 was 82.75". The pack 30 was heated to 1650° F. over 2½ hours and then rolled through box and bull head passes until it was 3 inches square, at which time its length was 65 feet. The length of the structural member encapsulated in the rolled matrix 12 approached 50 feet and from this a 40 foot usable structural member 4 was obtained after the matrix 12 was leached away in a nitric acid bath.

It should be noted that after the pack 30 is completely assembled from the matrix segments 14 and bars 24 and 26, the small unoccupied portions of the void 16 may be evacuated, either at room temperature or at elevated temperatures, to remove any contaminants introduced into the void 16 during assembly.

This invention is intended to cover all changes and modifications of the examples of the invention herein chosen for purposes of the disclosure which do not constitute departures from the spirit and scope of the invention.

What is claimed is:

1. A method for producing structural members having complex cross-sectional shapes, said method comprising encapsulating individual metal bars of relatively simple cross-sectional shape in a metal matrix such that the bars abut one another within the matrix whereby the form a pack, the matrix being formed from a different metal than the bars, hot rolling the pack such that it is transversely reduced in two dimensions and elongated whereby the bars will bond together at their abutting surfaces so as to form an integral structural member, and removing the matrix from the structural member.

2. A method according to claim 1 wherein the bars are composed primarily of titanium.

3. A method according to claim 2 wherein the matrix is formed from steel.

4. A method according to claim 2 and further characterized by heating the pack prior to rolling to a temperature slightly below the beta transus for the titanium metal from which the bars are formed, whereby the surface finish of the bars is not appreciably altered.

5. A method according to claim 1 wherein the matrix is removed by immersing the pack in an acid bath which readily attacks the metal of the matrix but not the metal of the bars.

6. A method according to claim 1 wherein the matrix includes mating matrix segments having outwardly opening cavities when separated and wherein the step of encapsulating the bars in the matrix comprises fitting the bars into the cavities, and welding the matrix segments together into an integral unit.

7. A method according to claim 2 wherein the bars comprise titanium alloys and wherein the pack containing titanium alloys is heated to within about 150° F. of its nominal beta transus prior to rolling.

References Cited

UNITED STATES PATENTS

| | | | |
|---|---|---|---|
| 2,861,327 | 11/1958 | Bechtold et al. | 29—497.5X |
| 3,393,445 | 7/1968 | Ulam | 29—497.5X |
| 3,427,706 | 2/1969 | Jaffee | 29—497.5X |
| 3,444,608 | 5/1969 | Conn, Jr. et al. | 29—475X |

JOHN F. CAMPBELL, Primary Examiner

R. J. SHORE, Assistant Examiner

U.S. Cl. X.R.

29—475, 493, 497.5